Figure 1:
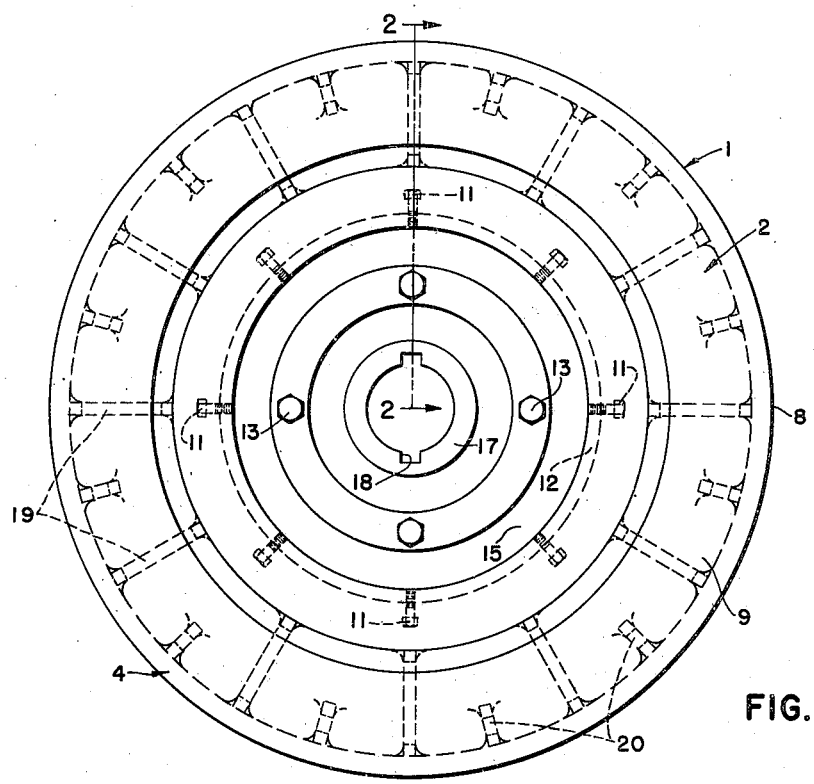

Nov. 22, 1949 A. HALLER ET AL 2,488,862

TIRE BUILDING CORE

Filed July 12, 1946

*INVENTORS*
ALBERT HALLER
JOSEPH TORREY, JR.

BY *R.H.Waters*

ATTORNEY

Patented Nov. 22, 1949

2,488,862

UNITED STATES PATENT OFFICE 2,488,862

TIRE BUILDING CORE

Albert Haller and Joseph Torrey, Jr., Akron, Ohio, assignors to Wingfoot Corporation, Akron, Ohio, a corporation of Delaware Application July 12, 1946, Serial No. 683,272

3 Claims. (Cl. 154—9)

The present invention relates to a form of tire building apparatus and the like. More particularly, the instant invention pertains to a type of temporary tire building core made of suitable frangible material advantageously employed in the manufacture of special sizes of tires or small numbers of tires of a given size. Cores of this type find particularly advantageous application in the experimental development of new tire designs.

In modern tire building operations tires are built according to a so-called "flat band" process which contemplates the use of a drum type of building core on which the tire is constructed in generally cylindrical form and thereafter shaped to its familiar toric configuration. The usual building drum is constructed of metal, particularly steel, and made in a plurality of segments which may be collapsed or taken apart to remove the completed tire. These segments are then reassembled and the reconstructed drum is ready for a repetition of the building operation.

It is frequently necessary in the development of tire building techniques to explore the possibilities of a variety of core shapes and sizes. In order to enable the completion of this exploratory work, a large number of different sizes and shapes of building drums or cores would be required. A complete range of sizes and shapes of such metal cores would involve a great financial outlay and make such extensive experimental work prohibitive.

It is, therefore, an important object of the present invention to provide a temporary tire building core which can be constructed in a variety of shapes without incurring the expense and delay involved in producing a collapsible metal core of the type normally used.

Another object of the present invention is to provide a highly satisfactory form of temporary tire building core fabricated from plaster of Paris or other similar frangible plastic material.

It is a further object of the present invention to provide a form of tire building core which can be economically manufactured and may be destroyed after it has been used.

A further object of the present invention is to provide a temporary tire building core of suitable frangible material which can be readily removed from the finished tire by breaking it up into small pieces.

It is a still further object of the present invention to provide a temporary tire building core which can be readily constructed in large numbers to the required shapes and sizes with small financial outlay and embodies certain parts which may advantageously be reused.

Other objects and advantages of the present invention will become apparent as the description of one form of temporary core structure embodying the teachings of the present invention proceeds.

Figure 2:
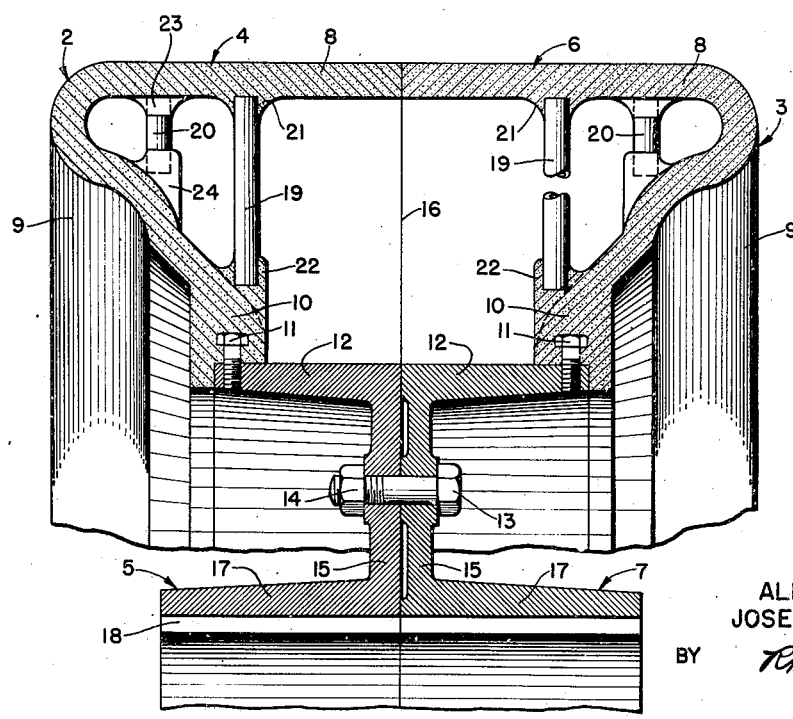

In the drawings, illustrative of a typical form of temporary tire building core, Fig. 1 is an elevation of the core. Fig. 2 represents a vertical cross-section with parts in elevation taken generally along the line 2—2 in Fig. 1 and drawn to an enlarged scale.

The assembled temporary tire building drum or core 1, illustrated in Figs. 1 and 2 of the drawings, comprises a plurality of parts or segments 2 and 3. The segment 2 of the core 1 comprises a portion or form 4 made of plaster of Paris or other suitable frangible plastic material secured to a mounting means 5 which takes the form of an annular member of generally channel-shaped cross-section. The segment 3 is substantially identical to segment 2 and embodies a form 6 mounted upon and supported by a mounting member 7.

In the manufacture of the temporary tire building core 1, the segments 2 and 3 may be formed according to any of several different conventional methods employing plaster of Paris or the like. According to one convenient method, the forms 4 and 6 of the segments 2 and 3 may be made by casting to a shape closely resembling that of the finished form and then applying a finish coating by a sweeping operation. It will be understood that the entire core structure may advantageously be swept out of plaster of Paris or the like. Thus, the forms 4 and 6 are provided with a smooth surface 8 which, in the present case, is of generally cylindrical form to the exact inner dimension of the finished tire as built. The surfaces 8 of the forms 4 and 6 are provided at one end thereof with reentrant or concave end portions 9.

The concave lower or end portions 9 terminate in an annular reinforcing rib 10 into which are embedded anchoring means which take the form of machine screws 11 threaded into the flange portion 12 of the annular mounting means 5 or 7 with the heads projecting into the body of the reinforcing rib 10. The screws 11 are disposed in equally spaced relation about the periphery of the flange portion 12 of the annular mounting means 5 or 7, as indicated in Fig. 1. The annular mounting means 5 or 7, with the screws 11 in place in the flange portion 12 thereof, is placed in a form and the plaster or other frangible material is molded in place thereon so as to cause reinforcing rib 10 to be securely anchored to the flange.

The segments 2 and 3, comprising the temporary tire building core 1, are assembled together in the manner illustrated in Fig. 2 with a plurality of bolts 13 and nuts 14 securing the web portions 15 of the mounting means 5 and 7 together. The segments 2 and 3 are fitted closely together with the cylindrical surfaces 8 of the forms 4 and 6 thereof in contiguous relation. The cylindrical surfaces 8 of the forms 4 and 6 are thus joined at contact surfaces 16 to form a completed continuous surface upon which the elements of the tire are assembled in the tire building operation.

The flanges 17 of the assembled mounting means 5 and 7 cooperate to define a hub portion which enables the completed temporary tire building core 1 to be rotatably mounted upon the shaft of a tire building machine or the like (not shown). The cooperating flanges 17 are provided with keyways 18 for the reception of a feather or key mounted upon the driving shaft of a tire building machine. Thus, the completed tire building core 1 is made hollow in form with a wall thickness such as will withstand the ordinary pressures encountered in stitching and other similar steps performed in the building operations employed in the manufacture of tires according to the conventional flat band process.

In order to enable the hollow structure of the cooperating segments 2 and 3 to withstand pressures and ordinary handling without breaking or cracking, it is desirable to insert the generally tubular reinforcing members 19 and 20 to provide additional support for the generally cylindrical surfaces 8 of the forms 4 and 6 of segments 2 and 3, respectively. These tubular reinforcing members 19 and 20 are disposed internally of the tire building core 1, as shown in Fig. 2 of the drawings and are advantageously arranged in equally spaced relation about the entire inner periphery of the core, the members 20 being advantageously disposed in alternate relationship with respect to the reinforcing members 19. The tubular reinforcing members 19 are adapted to be held in place by means of plaster fillets 21 and 22 formed at the top and bottom extremities of the members while the tubular reinforcing members 20 are similarly provided with fillets 23 and 24.

The finished temporary tire building core 1 is capable of withstanding comparatively rough treatment in view of its construction and method of reinforcing, but at the same time the walls are thin enough to permit the core to be broken out of the tire after the building operation is completed, enabling its removal from the finished tire in pieces. The use of plaster of Paris and other similar moldable frangible plastic materials greatly decreases the cost of manufacture of such temporary tire building cores, and the material possesses the desired properties of strength and frangibility which are highly advantageous in the accomplishment of the inventive concept of the present invention. The materials of this type are readily moldable and easily worked to provide smooth building surfaces at the surfaces 8 of the forms 4 and 6 and to facilitate the formation of the required curved pockets for the bead portions of the tire to be formed in the concave end portions of the structure.

It will be understood that numerous modifications may be made in the construction of the tire building core 1 without in any way departing from the spirit or scope of the invention. It is entirely conceivable that the surface 8 of the forms 4 and 6 may, if desired, be formed in a plurality of cooperating or mating segments other than the substantial half portions employed in the structure described hereinabove in detail. Other forms of reinforcing means may be employed to strengthen the plaster portion of the tire building core 1 other than the tubular members 19 and 20. The structure illustrated and described above represents the preferred embodiment of the invention and is particularly advantageous for the reason that it enables the annular mounting means 5 and 7 to be used again and again with various sizes and shapes of forms 4 and 6, thereby greatly diminishing the cost of such apparatus.

As a further alternative form of construction, the complete tire building core may be made up of plaster. It is not necessary, particularly in smaller core sizes, that a rigid supporting ring be used. The core itself may be provided with a hub having a keyway therein permitting it to be mounted upon a shaft or other driving support in the tire building apparatus.

While in accordance with the patent statutes one best known embodiment of the invention has been illustrated and described in detail, it is to be particularly understood that the invention is not limited thereto or thereby, but that the inventive scope is defined in the appended claims.

We claim:

1. An expendible core for use in tire building apparatus, said core comprising a pair of flanged supporting rings; means for securing said supporting rings together; a form fabricated of frangible material having a generally cylindrical surface embodying a pair of abutting segments, an assembled form having reentrant portions at the ends thereof and cooperating with the supporting rings to form a hollow substantially drumlike structure; a plurality of reinforcing members extending radially with respect to the supporting rings between the cylindrical surface and the reentrant portions of the form; and means for anchoring the form in place on the supporting rings.

2. A two-part expendible tire building core comprising a plurality of cooperating members each of which embodies a segment of frangible cementitious material having a portion of generally cylindrical configuration terminating in a substantially concave end portion, said segment being internally reinforced adjacent the concave end portion thereof by means of a plurality of radially extending elements disposed between the end portion and the cylindrical portion; and a mounting ring secured to the concave end portion of the plaster segment; and means for fastening the mounting rings together with the cylindrical portions of the frangible segments in contiguous relation to form a hollow substantially drumlike structure.

3. A two-part expendible tire building core comprising a plurality of cooperating members each of which embodies a segment formed of plaster having a portion with a generally cylindrically shaped surface terminating at one end thereof in a substantially concave end portion; a mounting ring; means in said mounting ring anchored in place in the concave end portion of the plaster segment; and reinforcing means disposed internally of the plaster segment adjacent the concave end portion, extending radially outward with respect to the mounting ring, and arranged in spaced relation about the cylindrical portion; and means fastening the mounting rings together with the cylindrical portions of the plaster segments in contiguous relation to each other to form a hollow substantially drumlike structure.

ALBERT HALLER.
JOSEPH TORREY, Jr.

REFERENCES CITED

The following references are of record in the file of this patent:

UNITED STATES PATENTS

| Number | Name | Date |
|---|---|---|
| 1,208,777 | Hatfield | Dec. 19, 1916 |
| 1,427,320 | Philips | Aug. 29, 1922 |
| 1,509,346 | Dykes | Sept. 23, 1924 |
| 1,562,662 | Stevens | Nov. 24, 1925 |
| 2,355,942 | Ash | Aug. 15, 1944 |
| 2,397,719 | Ash | Apr. 2, 1946 |

FOREIGN PATENTS

| Number | Country | Date |
|---|---|---|
| 381,658 | Great Britain | Oct. 13, 1932 |